United States Patent [19]
Klingler

[11] 4,044,410
[45] Aug. 30, 1977

[54] COMBINATION BUNK BED AND SEAT

[75] Inventor: Richard Klingler, Elkhart, Ind.

[73] Assignee: Holiday Rambler Corporation, Wakarusa, Ind.

[21] Appl. No.: 716,527

[22] Filed: Aug. 23, 1976

[51] Int. Cl.² .................... A47C 13/00; A47C 17/04
[52] U.S. Cl. ............................................. 5/9 R
[58] Field of Search ................................. 5/9, 15–42

[56] References Cited

U.S. PATENT DOCUMENTS

| 27,234 | 2/1860 | Peikhardt | 5/37 C |
|---|---|---|---|
| 567,819 | 9/1896 | Udstad | 5/37 C |
| 2,550,599 | 4/1951 | Reed | 5/9 R |
| 2,891,255 | 6/1959 | Simmons | 5/9 R |

FOREIGN PATENT DOCUMENTS

| 48,672 | 8/1919 | Sweden | 5/28 |
|---|---|---|---|
| 668,048 | 3/1952 | United Kingdom | 5/42 |

*Primary Examiner*—Richard E. Moore

[57] ABSTRACT

A foldable bunk bed convertible into a seating unit with the upper sleeping surface serving as a back rest.

2 Claims, 3 Drawing Figures

U.S. Patent
Aug. 30, 1977
4,044,410
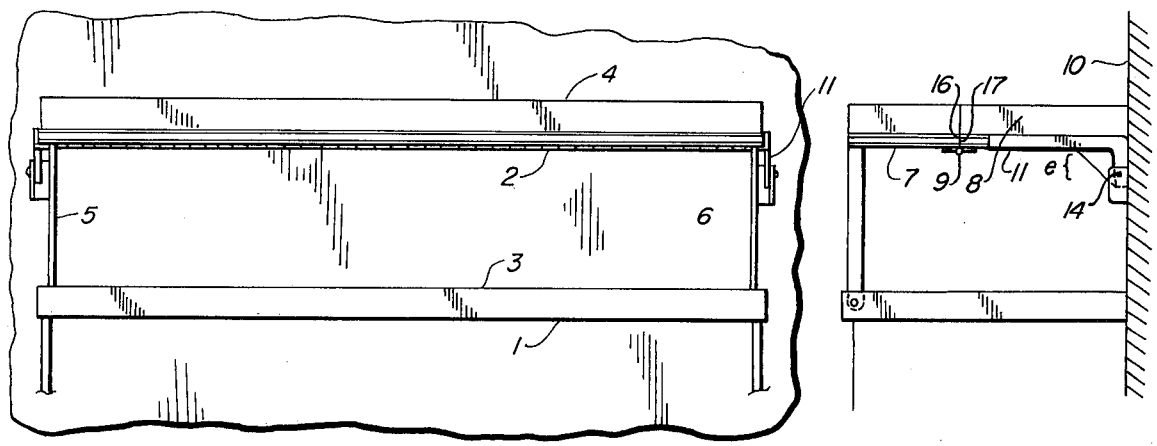
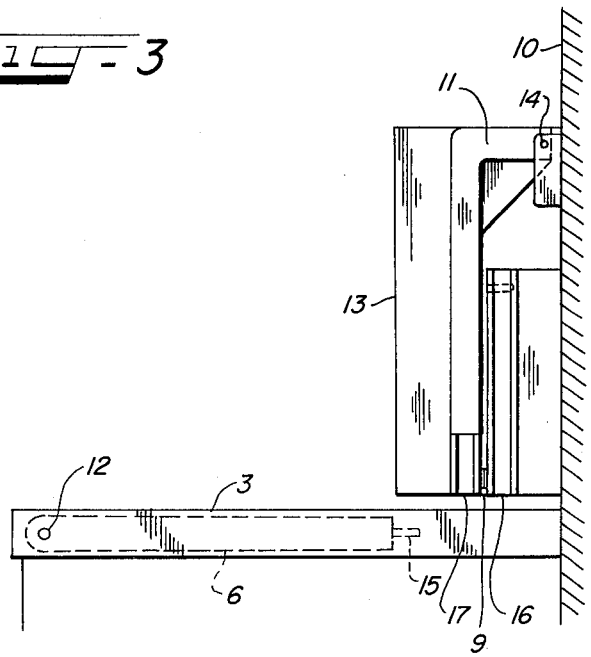

COMBINATION BUNK BED AND SEAT

BACKGROUND OF THE INVENTION

This invention relates to wall mounted fold down bunks primarily for use in campers and recreational vehicles. For such use it is desirable to provide a bunk which can be readily converted into a seating unit by using the upper bunk bed portion as the back rest when the unit is in the seating mode.

Accordingly, it is an object of the present invention to provide a wall mounted bunk bed suitable for conversion into a seating unit by utilizing the upper bunk portion as the back rest.

It is the primary object of the present invention to provide a combination bunk bed seating arrangement in which the upper bunk bed portion provides a full width sleeping surface when the unit is in its bunk bed mode but which can be installed so as to occupy vertical wall space of less than a full width sleeping unit.

BRIEF SUMMARY OF INVENTION

The present invention is comprised of two sleeping surfaces. The lower sleeping surface may be installed in any known manner. It can be ridgly fixed in place or can be hinged to provide a storage area or the like. The upper sleeping surface is pivotally connected to the wall for rotational movement downward so that the upper surface can be utilized as a backrest and the lower sleeping surface as a seat portion. The upper sleeping surface of the present invention consists of two segments hingedly connected together. The section farthest away from the wall is of a width less than the section immediately adjacent to and pivotally attached to the wall. This section can then be folded back on to the section adjacent the wall by rotating it 180°. The entire upper bed portion can then be rotated downward to form the backrest portion.

With the arrangement of the present invention, the fold down bunk requires minimal height and wall space for installation and yet can provide a full width bunk. Moreover, the reduced wall space requirement permits positioning of the bunk in hard to locate areas such as under windows.

Other objects and advantages will become apparent from the following detailed description and upon reference to the drawings in which:

FIG. 1 is a plan view of the present invention arranged as a sleeping unit;

FIG. 2 is a view along the lines 2—2 of FIG. 1;

FIG. 3 is a view corresponding to FIG. 2 with the unit arranged to serve as a sleeping unit.

While the invention is described in connection with a preferred embodiment it will be understood that I do not intend to be limited to the particular embodiment shown, but intend, on the contrary, to cover the various alternative and equivalent forms of the invention included within the spirit and scope of the appended claims.

Turning now to the drawings, and in particular to FIG. 1, a bunk bed arrangement is provided having lower support surface 1 and upper support surface 2. These support surfaces are provided with cushions 3 and 4 respectively.

The upper support surface is maintained in spaced vertical relationship with the lower support surface by means of support legs 5 and 6.

As can be seen from FIG. 2, the upper bed surface 2 consists of short segment 7 and a longer segment 8 hingedly connected by hinge 9. Surfaces 7, 8 are maintained in coplanar relationship by abutment of surface 16 against surface 17. Segment 8 is pivotally attached to the wall 10 by means of bracket 11, which is preferably constructed of aluminum angles or other light weight material.

In the preferred embodiment of the present invention the upper support surface 2 is eccentrically mounted on wall 10. With the unit arranged in the bunk bed mode, the upper support surface is eccentrically mounted in a vertical direction from pivot point 14. The amount of eccentricity $e$ is determined by the combined thickness of segment 7 and cushion 4 and by the distance of pivot point 14 from wall 10. In the preferred embodiment $e$ equals the sum of the thicknesses of support surface 7 and cushion 4 minus the distance pivot point 14 extends from wall 10.

The bunk unit is converted into a seating unit by first removing support legs 5 and 6 which are preferably pivotally mounted at the lower bed surface, for example, at 12. The support legs can then be rotated 90° out of the way as shown in FIG. 3.

With the support legs removed, segment 7 of the upper sleeping surface is rotated approximately 180° downward (counterclockwise as viewed in FIG. 2). Segment 8 is then rotated 90° downward until the configuration shown in FIG. 3 is achieved. In the configuration shown in FIG. 3 the lower sleeping cushion 3 serves as a seat while the upper cushion portion 13 serves as a backrest. Segment 7 of the upper sleeping portion along with cushion 4 abut against outer wall 10.

Accordingly it can be seen that although a full width upper sleeping surface is provided with the unit in the bunk bed mode, the upper sleeping surface need not be vertically displaced from the lower surface by an amount equal to a full width sleeping surface. Thus, the present invention can be installed in areas having limited vertical wall space.

I claim:

1. A foldable bunk bed and seating arrangement comprising a first horizontally disposed bed surface located adjacent a wall, a second bed surface vertically spaced from said first surface, said second surface having a first generally rigid segment, and a second lip segment hingedly connected to said first segment so as to permit approximately 180° rotational movement of said second segment from a rigid position coplanar with said first segment to a position approximately parallel to and contiguous with said first segment, said first segment eccentrically mounted to the wall a distance so as to accommodate the thickness of said second segment when the second bed surface is in the seating mode, support means engageable with said second segment to support said segment in its coplanar position.

2. The invention as claimed in claim 1 in which the support means consist of two support legs pivotally mounted at the front end of the first bed surface.